(12) United States Patent
Orzechowski

(10) Patent No.: US 9,453,855 B2
(45) Date of Patent: Sep. 27, 2016

(54) SYSTEM AND METHOD FOR CALIBRATING AN INERTIAL MEASUREMENT UNIT

(71) Applicant: ThinKom Solutions, Inc., Torrance, CA (US)

(72) Inventor: Pawel Orzechowski, Playa Vista, CA (US)

(73) Assignee: ThinKom Soultions, Inc., Hawthorne, CA (US)

( * ) Notice: Subject to any disclaimer, the term of this patent is extended or adjusted under 35 U.S.C. 154(b) by 449 days.

(21) Appl. No.: 14/071,844

(22) Filed: Nov. 5, 2013

(65) Prior Publication Data

US 2015/0121989 A1    May 7, 2015

(51) Int. Cl.
*G01P 21/00* (2006.01)
*G01C 25/00* (2006.01)
*H01Q 3/08* (2006.01)

(52) U.S. Cl.
CPC .............. *G01P 21/00* (2013.01); *G01C 25/00* (2013.01); *H01Q 3/08* (2013.01)

(58) Field of Classification Search
None
See application file for complete search history.

(56) References Cited

U.S. PATENT DOCUMENTS

| 3,599,495 | A | 8/1971 | Brown et al. |
| 5,421,187 | A | 6/1995 | Morgan |
| 8,259,020 | B1 | 9/2012 | Macy et al. |
| 2004/0211238 | A1 | 10/2004 | Hanse |
| 2009/0013755 | A1 | 1/2009 | Tsai |
| 2011/0301902 | A1 | 12/2011 | Panagas |

FOREIGN PATENT DOCUMENTS

WO      WO 03040656       5/2003

OTHER PUBLICATIONS

Extended European Search Report dated Mar. 31, 2015 for corresponding EP application No. 14191916.7 filed Nov. 5, 2014.

*Primary Examiner* — Robert R Raevis
(74) *Attorney, Agent, or Firm* — Renner, Otto, Boisselle & Sklar, LLP.

(57) ABSTRACT

An apparatus and method is presented for calibrating an output(s) of an inertial measurement unit (IMU) using rotational rate as a reference. Calibrating the IMU output(s) is performed by comparing the IMU output(s) to expected output(s), where the expected output(s) are determined based on the known rate of rotation of the IMU and the centripetal force acting on the IMU due to known rate of rotation. By analyzing the differences between the expected IMU output(s) and the IMU output(s), it is possible to determine a correction factor that, when applied to the IMU output(s), calibrates the IMU output(s) by correcting for measurement errors.

28 Claims, 5 Drawing Sheets

SYSTEM AND METHOD FOR CALIBRATING AN INERTIAL MEASUREMENT UNIT

TECHNICAL FIELD

The present invention relates generally to inertial measurement units, and particularly to methods and systems for calibrating inertial measurement units.

BACKGROUND

An inertial measurement unit (IMU) provides both inertial measurements (using gyroscopes) and acceleration measurements (using accelerometers). Gyroscopes and accelerometers, however, are both sensors inherently corrupted by measurement errors. Measurement error sources include a sensor's post-processing electronic circuitry, variation in supplied power, thermally induced variations, etc. Sensor calibration is used to remove measurement errors by estimating a sensor's error and providing adjustment corrections to the IMU in order to improve its performance (e.g., accuracy).

For IMUs with three orthogonal sense axes, conventional IMU calibration methods require successive repositioning of the IMU sense axes along the three orthogonal dimensions to appropriately exercise each sense axis. For small stand-alone IMU packages this is done with simple reconfigurable fixtures and precise rate tables. In the case of angular rates, the gyroscope output is compared against an output of a rate table, where the gyroscope's sense axis is aligned with the table's spin axis. Conventional methods for calibrating an accelerometer output are based on comparing the accelerometer output to the expected gravitational field. Thus, in order to accurately calibrate the accelerometers, a precise knowledge of the accelerometer sense axis orientation with respect to the gravitation field is required. To characterize thermally induced error variations, the rate table along with the IMU mount fixture is placed inside of a thermal chamber and the temperature is varied while the calibration of the IMU is repeated.

For large systems with integrated IMUs, such as gimbaled antennas, a successful calibration requires significantly more complicated and rugged rate tables and fixtures capable of supporting the increased weight and awkward shapes of the large systems. If the thermal chamber cannot support the weight, size, and/or the awkward shape of the integrated system, IMU calibration with respect to temperature is bypassed at the price of decreased performance.

SUMMARY OF INVENTION

The present invention provides an apparatus, and method for calibrating a gyroscope output and accelerometer output of an IMU using rotational rate as a reference.

According to one aspect of the invention, there is provided a calibration apparatus for calibrating an inertial measurement unit (IMU) having a sense axis and producing an output representative of an orientation of the sense axis. The calibration apparatus includes a rotational hub, an elevation hub, and a controller system. The rotational hub is configured to rotate the IMU about the first axis of rotation. The elevation hub is configured to rotate the IMU about a second axis of rotation perpendicular to the first axis of rotation. The orientation of the sense axis relative to the first axis is controllable by rotation of the IMU about the second axis. The controller system is configured in combination with the rotation hub and elevation hub to rotate the IMU about the first axis of rotation at a known rate of rotation with the IMU positioned at a first elevation relative to the second axis of rotation. The controller system is also configured in combination with the rotation hub and elevation hub to rotate the IMU about the first axis of rotation at a known rate of rotation with the IMU positioned at a second elevation relative to the second axis of rotation, the second elevation being different from the first elevation. The controller system is further configured in combination with the rotation hub and elevation hub to, based on the output of the IMU during the rotation of the IMU at the first elevation and the output of the IMU during the rotation of the IMU at the second elevation, determine an IMU correction factor for calibrating the output of the IMU.

Alternatively or additionally, the controller system is configured to determine the IMU correction factor by comparing the output of the IMU at the first elevation and the output of the IMU at the second elevation with an expected output of the IMU at the first elevation and an expected output of the IMU at the second elevation. The expected output is based on the known rate of rotation of the IMU about the first axis and the known elevation of the IMU relative to the second axis.

Alternatively or additionally, applying the IMU correction factor to the output of the IMU at the first elevation and the output of the IMU at the second elevation calibrates the output of the IMU such that: the difference between the expected output of the IMU at the first elevation and the calibrated output of the IMU at the first elevation is less than the difference between the expected output of the IMU at the first elevation and the output of the IMU at the first elevation; and the difference between the expected output of the IMU at the second elevation and the calibrated output of the IMU at the second elevation is less than the difference between the output of the IMU at the second elevation and the calibrated output of the IMU at the second elevation.

Alternatively or additionally, the IMU includes one or more gyroscopes and one or more accelerometers and determining the expected output of the IMU further includes: determining an expected output of the one or more accelerometers based on an estimated centripetal force experienced by the IMU; and determining an expected output of the one or more gyroscopes based on the known rate of rotation.

Alternatively or additionally, the centripetal force experienced by the IMU is dependent on a location of the IMU relative to the first axis and the location of the IMU relative to the first axis is additionally dependent upon a position of the IMU about the second axis of rotation.

Alternatively or additionally, the IMU is mounted at a distance offset from the second axis of rotation.

Alternatively or additionally, the calibration apparatus further includes a chamber. The controller system is configured to control the temperature in the chamber and the rotational hub, elevation hub, and IMU are located within the chamber.

Alternatively or additionally, the controller system is configured to set the chamber temperature prior to determining the IMU correction factor.

Alternatively or additionally, the controller system is configured to set the chamber temperature to multiple different temperatures and determine the IMU correction factor for each temperature of the multiple different temperatures.

Alternatively or additionally, the controller system is further configured to determine the relationship between temperature and the output of the IMU and/or the IMU correction factor.

Alternatively or additionally, the relationship between temperature and the actual output of the IMU and/or the IMU correction factor is determined by estimating coefficients of an N-th degree polynomial.

Alternatively or additionally, the coefficients are estimated recursively.

Alternatively or additionally, the IMU correction factor is determined by fitting a rational polynomial to the actual output of the IMU.

According to another aspect of the invention, there is provided self-calibrating gimbaled antenna configured to calibrate an inertial measurement unit (IMU), the gimbaled antenna comprising the IMU, a rotation hub, an elevation hub, and a controller system. The IMU has a sense axis and produces an output representative of an orientation of the sense axis. The rotational hub is configured to rotate the IMU about the first axis of rotation. The elevation hub is configured to rotate the IMU about a second axis of rotation perpendicular to the first axis of rotation. The orientation of the sense axis relative to the first axis is controllable by rotation of the IMU about the second axis. The controller system is configured in combination with the rotation hub and elevation hub to rotate the IMU about the first axis of rotation at a known rate of rotation with the IMU positioned at a first elevation relative to the second axis of rotation. The controller system is alo configured in combination with the rotation hub and elevation hub to rotate the IMU about the first axis of rotation at a known rate of rotation with the IMU positioned at a second elevation relative to the second axis of rotation, the second elevation being different from the first elevation. The controller system is further configured in combination with the rotation hub and elevation hub to, based on the output of the IMU during the rotation of the IMU at the first elevation and the output of the IMU during the rotation of the IMU at the second elevation, determine an IMU correction factor for calibrating the output of the IMU.

Alternatively or additionally, the controller system is configured to determine the IMU correction factor by comparing the output of the IMU at the first elevation and the output of the IMU at the second elevation with an expected output of the IMU at the first elevation and an expected output of the IMU at the second elevation. The expected output is based on the known rate of rotation of the IMU about the first axis and the known elevation of the IMU relative to the second axis.

Alternatively or additionally, applying the IMU correction factor to the output of the IMU at the first elevation and the output of the IMU at the second elevation calibrates the output of the IMU such that: the difference between the expected output of the IMU at the first elevation and the calibrated output of the IMU at the first elevation is less than the difference between the expected output of the IMU at the first elevation and the output of the IMU at the first elevation; and the difference between the expected output of the IMU at the second elevation and the calibrated output of the IMU at the second elevation is less than the difference between the output of the IMU at the second elevation and the calibrated output of the IMU at the second elevation.

Alternatively or additionally, the IMU includes one or more gyroscopes and one or more accelerometers and determining the expected output of the IMU further includes: determining an expected output of the one or more accelerometers based on an estimated centripetal force experienced by the IMU; and determining an expected output of the one or more gyroscopes based on the known rate of rotation.

Alternatively or additionally, the centripetal force experienced by the IMU is dependent on a location of the IMU relative to the first axis and the location of the IMU relative to the first axis is additionally dependent upon a position of the IMU about the second axis of rotation.

Alternatively or additionally, the IMU is mounted at a distance offset from the second axis of rotation.

Alternatively or additionally, the self-calibrating gimbaled antenna further includes a flat plate antenna. The IMU is mounted to a surface of the flat plate antenna.

Alternatively or additionally, the self-calibrating gimbaled antenna further includes a temperature sensor. The controller system is further configured to associate the determined IMU correction factor with a current temperature measured using the temperature sensor.

According to a further aspect of the invention, there is provided a method of calibrating an inertial measurement unit (IMU) having a sense axis and producing an output representative of an orientation of the sense axis. The method includes rotating the IMU along a second axis of rotation to a first elevation, the orientation of the sense axis relative to a first axis of rotation being controllable by rotation of the IMU about the second axis. The first axis of rotation is perpendicular to the second axis rotation. The method also includes rotating the IMU about the first axis of rotation at a known rate of rotation with the IMU positioned at the first elevation relative to the second axis of rotation. The method further includes rotating the IMU along the second axis of rotation to a second elevation and rotating the IMU about the first axis of rotation at a known rate of rotation with the IMU positioned at the second elevation relative to the second axis of rotation. The method also includes determining, based on the output of the IMU during the rotation of the IMU at the first elevation and the output of the IMU during the rotation at the second elevation, an IMU correction factor for calibrating the output of the IMU.

Alternatively or additionally, the controller system is configured to determine the IMU correction factor by comparing the output of the IMU at the first elevation and the output of the IMU at the second elevation with an expected output of the IMU at the first elevation and an expected output of the IMU at the second elevation. The expected output is based on the known rate of rotation of the IMU about the first axis and the known elevation of the IMU relative to the second axis.

Alternatively or additionally, applying the IMU correction factor to the output of the IMU at the first elevation and the output of the IMU at the second elevation calibrates the output of the IMU such that: the difference between the expected output of the IMU at the first elevation and the calibrated output of the IMU at the first elevation is less than the difference between the expected output of the IMU at the first elevation and the output of the IMU at the first elevation; and the difference between the expected output of the IMU at the second elevation and the calibrated output of the IMU at the second elevation is less than the difference between the output of the IMU at the second elevation and the calibrated output of the IMU at the second elevation.

Alternatively or additionally, the IMU includes one or more gyroscopes and one or more accelerometers and determining the expected output of the IMU further includes: determining an expected output of the one or more accelerometers based on an estimated centripetal force experienced by the IMU; and determining an expected output of the one or more gyroscopes based on the known rate of rotation.

Alternatively or additionally, the centripetal force experienced by the IMU is dependent on a location of the IMU relative to the first axis and the location of the IMU relative to the first axis is additionally dependent upon a position of the IMU about the second axis of rotation.

Alternatively or additionally, the method further includes, prior to rotating the IMU along the second axis of rotation to the first elevation, setting a current temperature to a measurement temperature.

Alternatively or additionally, the method further including changing the current temperature between a series of measurement temperatures and, for each measurement temperature, determining the IMU correction factor for calibrating the output of the IMU at the measurement temperature.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DETAILED DESCRIPTION OF INVENTION

Figure 1A:
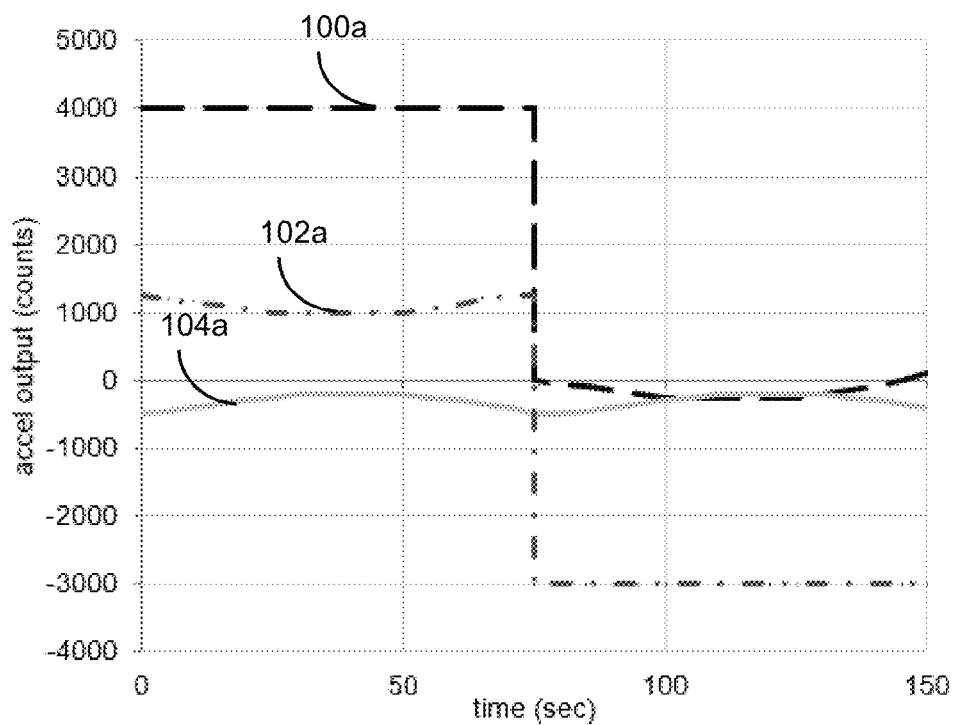
FIG. 1A is a plot depicting exemplary IMU output(s)

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

The present invention provides a calibration apparatus and method for calibrating a gyroscope output and an accelerometer output of an IMU using rotational rate as a reference. Calibrating the IMU output(s) is performed by comparing the IMU output(s) to expected output(s), where the expected output(s) are determined based on a known rate of rotation of the IMU and the centripetal force acting on the IMU due to the known rate of rotation. By analyzing the differences between the expected IMU output(s) and the IMU output(s), it is possible to determine correction factor(s) that, when applied to the IMU output(s), calibrates the IMU output(s) by correcting for measurement errors.

In the present application, rate of rotation may refer to, e.g., angular rate, angular speed, radial frequency, circular frequency, orbital frequency, or radian frequency.

Conventional IMU calibration methods rely on gravity as a reference to compensate for accelerometer measurement errors and angular rates to compensate for gyroscope measurement errors. A majority of IMUs used for attitude determination employ three sense-axis gyros and three sense-axis accelerometers, requiring rotating the IMU in all three directions to calibrate all three sense axes using conventional calibration methods. By using rotational rate as a reference to calibrate both accelerometer outputs and gyroscope outputs of an IMU, the calibration apparatus and method described in this application simplifies the calibration process by reducing the number of sensor orientations required for calibration.

Turning initially to FIG. 1A, exemplary output(s) of an IMU rotating at a constant rate of rotation are shown. In this example, the IMU includes three accelerometers, each having a sense axis oriented perpendicularly to the sense axes of the other accelerometers. The IMU output(s) consists of three outputs 100a, 102a, 104a, one output for each accelerometer. The output (respectively labeled 100a, 102a, 104a) of each accelerometer represents the component of the centripetal force acting along the sense axis of that accelerometer. For example, output 100a may correspond to the component of centripetal force acting along the x-axis (perpendicular to the vector of gravitational force), output 102a may correspond to the component of centripetal force acting along the y-axis (perpendicular to the x-axis and the vector of gravitational force), and output 104a may correspond to the component of centripetal force acting along the z-axis (perpendicular to the x-axis and the y-axis and parallel to the vector of gravitational force). In this example, the IMU output(s) (consisting of the three accelerometer outputs 100a, 102a, 104a) are shown in FIG. 1A, where—for approximately 75 seconds—the IMU is rotated about an axis of rotation at a variable rotational rate with the sense axes of the accelerometers located at a fixed orientation relative to the axis of rotation (e.g., the IMU is positioned as shown in FIG. 2A and discussed below). At approximately 75 seconds, while the IMU continues to rotate, the orientation of the IMU is changed by approximately 90° such that the orientation of the sense axes of the three accelerometers changes (e.g., the IMU is changed to the position shown in FIG. 4 as discussed below). The change in orientation of the sense axes results in an abrupt change in the force experienced by each accelerometer along its sense axis. This change is depicted in FIG. 1A by the change in acceleration output 100*a*, 102*a*, 104*a* of each accelerometer. For example, in FIGS. 1A-1C, the accelerometer outputting output 100 was aligned with the vector of gravitational force for approximately the first 75 seconds. After the orientation of the IMU is changed at approximately 75 seconds, the accelerometer outputting output 102 is aligned with the vector of gravitational force. This is apparent from FIG. 1B, where output 100*b* is approximately equal to gravitational acceleration (9.8 m/s$^2$) for the first 75 seconds and output 102*b* is approximately equal to gravitational acceleration after the first 75 seconds.

Figure 1B:
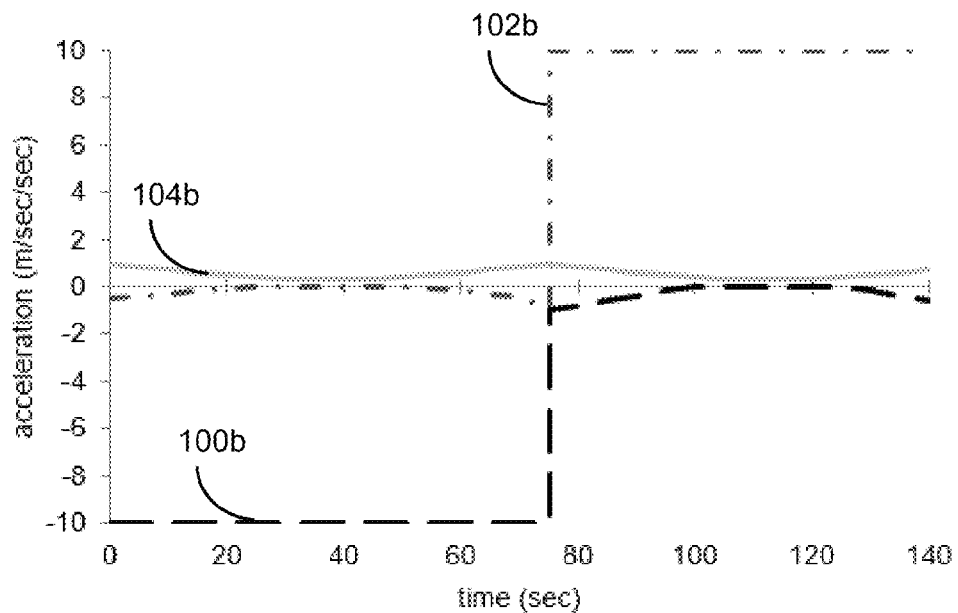
FIG. 1B is a plot depicting exemplary expected IMU output(s)
Figure 2A:
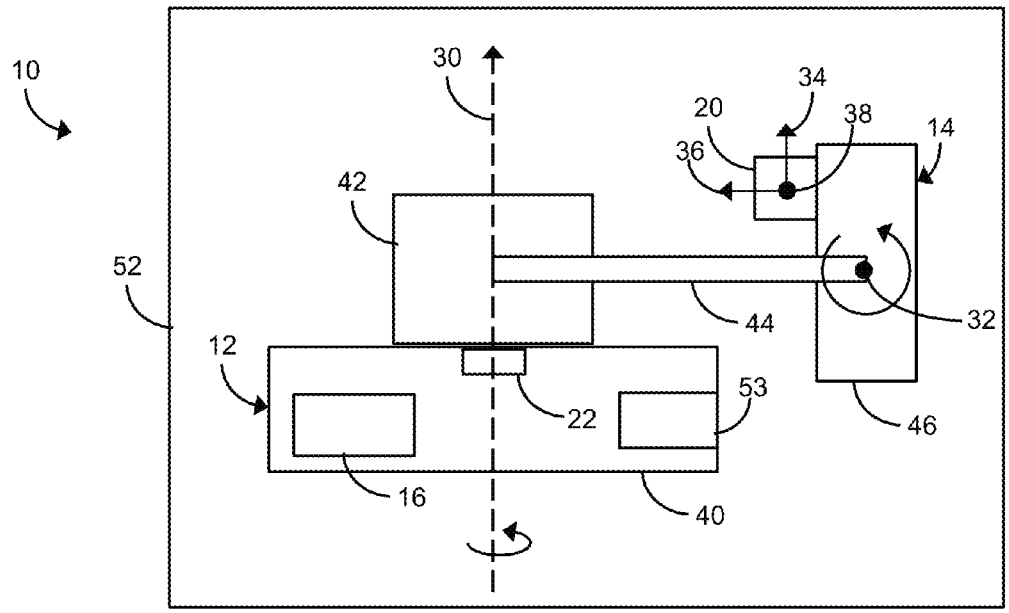
FIGS. 2A and 2B are alternative views of a schematic diagram of a calibration apparatus.

Turning to FIG. 1B, because the rate of rotation and orientation of the accelerometer sense axes relative to the axis of rotation are known, expected output(s) 100*b*, 102*b*, 104*b* of the accelerometers (e.g., theoretical forces experienced by the IMU) respectively, may be estimated based on the centripetal force experienced by the IMU. The expected output(s) 100*b*, 102*b*, 104*b* of the IMU are shown in FIG. 1B. It is apparent from a comparison of FIGS. 1A and 1B that the output(s) 100*a*, 102*a*, 104*a* of the IMU do not match the expected output(s) 100*b*, 102*b*, 104*b* of the IMU. The differences between the expected output(s) 100*b*, 102*b*, 104*b* in FIG. 1B and the actual output(s) of the IMU 100*a*, 102*a*, 104*a* in FIG. 1A are due to measurement errors inherent in the accelerometer. The measurement errors are, in general, constant for a given temperature and can be calibrated to yield improved IMU output(s). The most common measurement errors are biases and scale factor errors that, in general, vary with temperature.

Figure 1C:
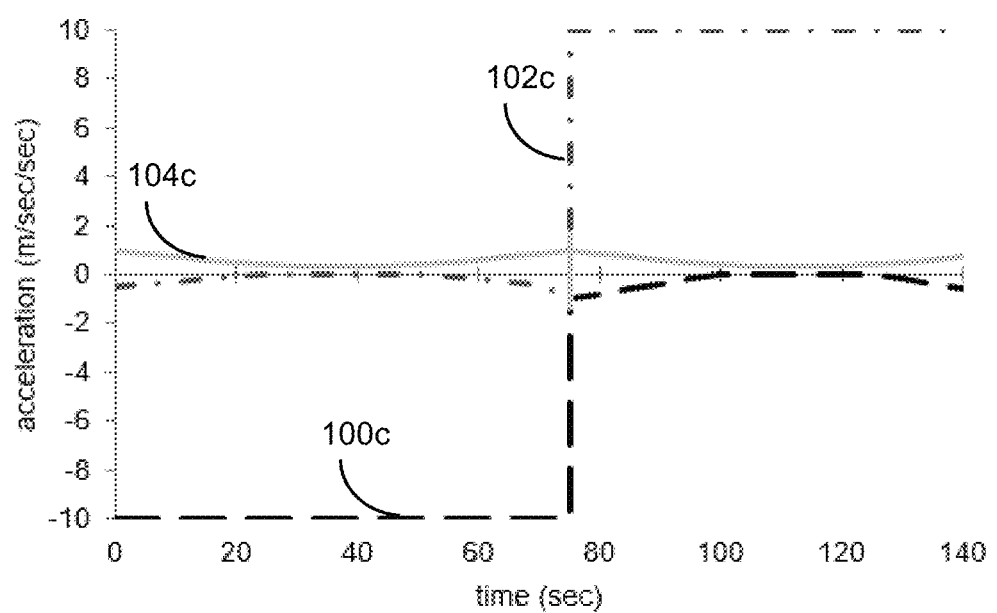
FIG. 1C is a plot depicting the exemplary IMU output(s) from FIG. 1A that have been calibrated.

By comparing the IMU output(s) 100*a*, 102*a*, 104*a* to the expected IMU output(s) 100*b*, 102*b*, 104*b*, it is possible to determine correction factor(s) that correct for the measurement errors (i.e., biases and scale factors). The correction factor(s) may include one or more components specific to each IMU output for correcting the measurement errors. In this way, as shown in FIG. 1C, by applying the correction factor(s) to the IMU output(s) 100*a*, 102*a*, 104*a*, calibrated IMU output(s) 100*c*, 102*c*, 104*c* are generated that more closely match the expected output(s) of the IMU 100*b*, 102*b*, 104*b* as compared to the uncalibrated IMU output(s) 100*a*, 102*a*, 104*a* shown in FIG. 1A.

Figure 2B:
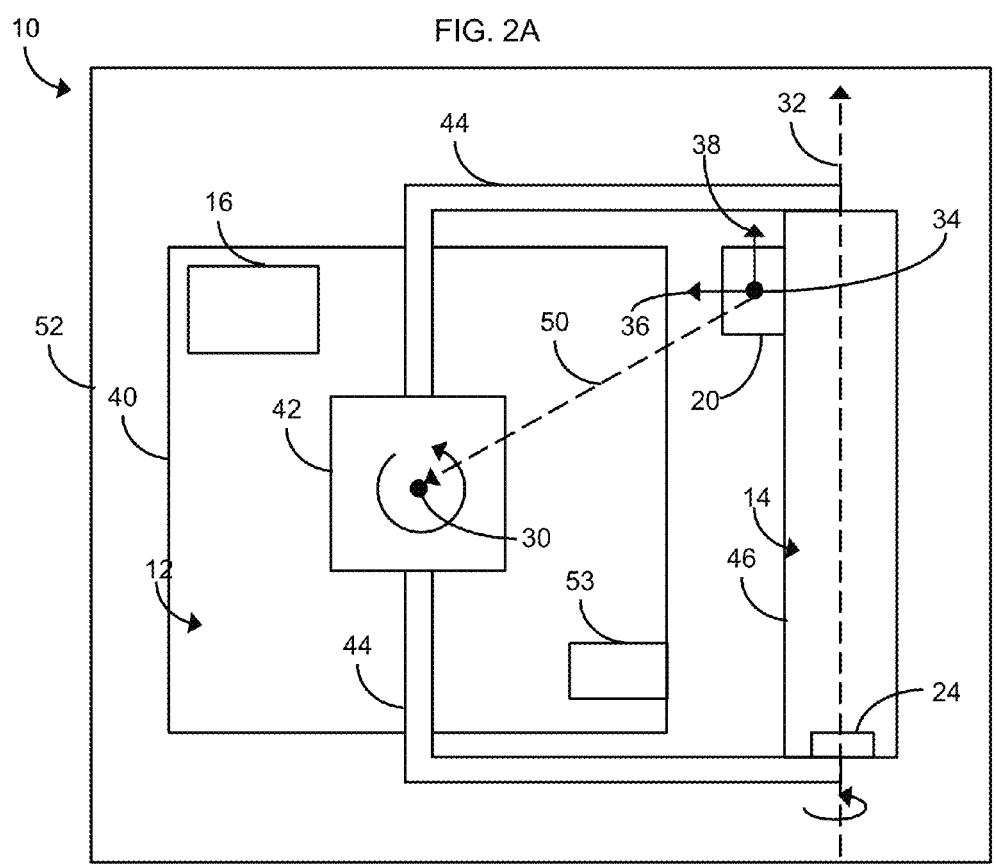

Turning to FIGS. 2A and 2B, a calibration apparatus 10 includes a rotational hub 12, an elevation hub 14, and a controller system 16. The calibration apparatus 10 may additionally include an azimuth gimbal servo 22, an elevation gimbal servo 24, and an IMU 20. The rotational hub 12, elevation hub 14, controller system 16, and IMU 20 may each be separate physical components or one or more physical components including a combination of one or more of the rotational hub 12, elevation hub 14, controller system 16, and IMU 20. The IMU 20 may include one or more accelerometers and gyroscopes. The controller system 16 may send rotation commands to both the rotational hub 12 and the elevation hub 14 and receive outputs from the IMU 20. The rotation commands may include instructions for rotating about a first axis 30 (e.g., an azimuth axis) at a known rate and rotating about a second axis 32 (e.g., an elevation axis) to a given elevation. The received output(s) from the IMU 20 may include measurements of forces acting along one or more sense axes 34, 36, 38 of the IMU 20. For example, as in FIGS. 1A and 1B, if the rotational hub 12 rotates about the first axis 30 at a given rate of rotation and the IMU 20 includes three accelerometers arranged so that the sense axes 34, 36, 38 of the accelerometers are perpendicular to one another, the IMU 20 may have three outputs, where each output represents the component of the centripetal force acting on the IMU 20 about each sense axis 34, 36, 38 due to rotation of the IMU 20.

Figure 3:
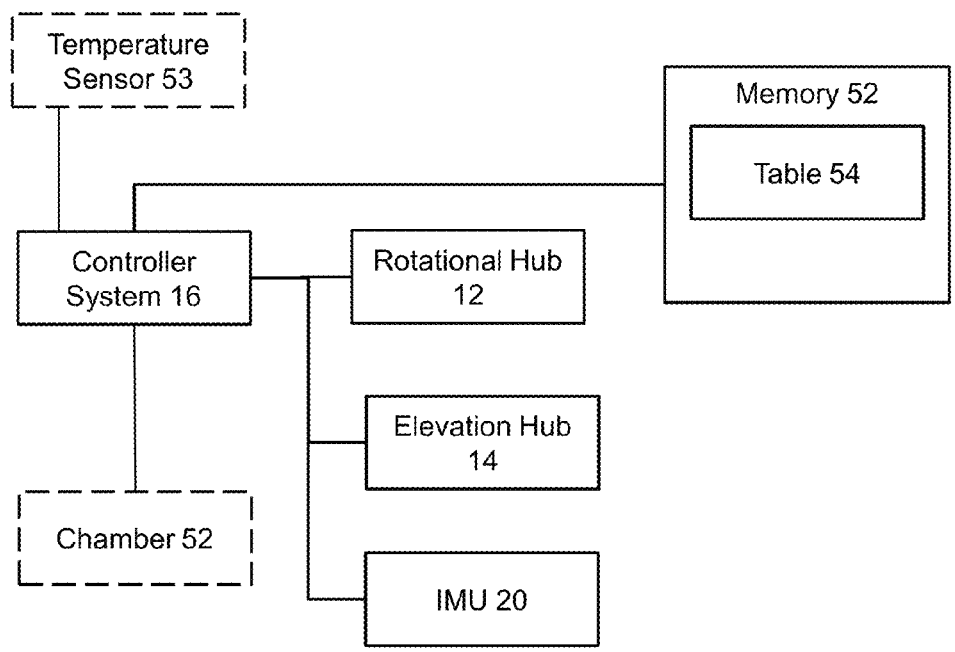
FIG. 3 is a block diagram depicting the connections between the different components of the calibration apparatus.

As shown in FIG. 3, the various components of the calibration apparatus 10 may be interconnected. For example, as described above, the controller system 16 may control the rate of rotation of the rotational hub 12 and rotation of the elevation hub 14 about the second axis of rotation 32. The rotational hub 12 may also provide feedback to the controller system 16 regarding the current rate of rotation about the first axis of rotation 30 and any other information required by the controller system 16. Similarly, the elevation hub 14 may provide feedback to the controller system 16 regarding the current position of the IMU about the second axis of rotation 32 and any other necessary information. The controller 16 may also receive the output(s) of the IMU and, as described below, a current temperature from a chamber 52 or a temperature sensor 53. The controller system 16 may determine the expected output(s) of the IMU based on the centripetal equation for force and differentiation of the outputs of the IMU corresponding to angular measurements.

While FIGS. 2A and 2B are described as views of a calibration apparatus 10, the calibration apparatus may comprise a gimbaled antenna. By including the IMU 20 in the gimbaled antenna, the antenna may self-calibrate without the use of additional sensors and/or hardware. That is, if the IMU 20 is integrated with an antenna gimbal system in such a way that the IMU 20 is free to move about the first axis 30 (i.e. the azimuth axis) and the second axis 32 (i.e. the elevation axis), the need for a rate table and additional mounting fixtures is eliminated. Additionally, while the apparatus is described throughout the application as a calibration apparatus 10, the same description applies if the calibration apparatus is a gimbaled antenna.

The rotational hub 12 is configured to rotate the IMU 20 about the first axis of rotation 30. As will be understood by one of ordinary skill in the art, the rotational hub 12 may comprise any suitable apparatus for rotating the IMU 20 about the first axis of rotation 30. For example, the rotational hub 12 may include a base 40, an azimuth gimbal servo 22, and a stand 42. The stand 42 may be rotationally mounted to the base 40 by the azimuth gimbal servo 22, such that the stand 42 rotates about the first axis 30 on the azimuth gimbal servo 22. As shown in FIG. 3, the rotational hub 12 may rotate the stand about the first axis 30 at a known rate of rotation specified by the controller system 16. The rotational hub 12 may provide feedback to the controller system 16 regarding a current rate of rotation of the stand 12 about the first axis of rotation 30. The rotational hub 12 may additionally include a sensor that measures the current rotation rate of the IMU and support arms 44 that are attached to the elevation hub 14.

Figure 4:
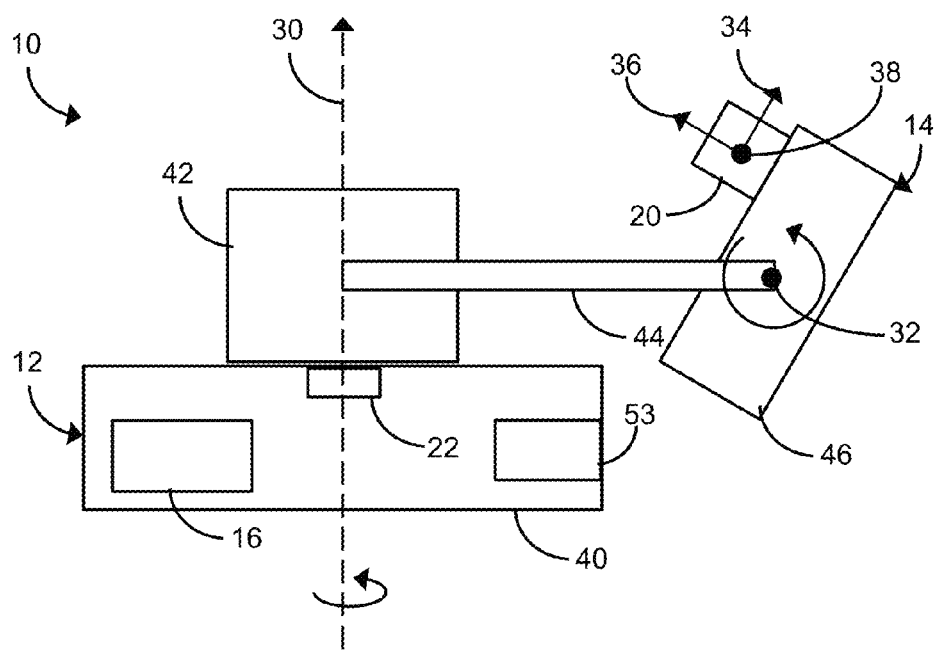
FIG. 4 is a schematic diagram of the calibration apparatus in FIG. 2 with the IMU located at a different elevation.

The elevation hub 14 is configured to rotate the IMU 20 about a second axis of rotation 32 perpendicular to the first axis of rotation 30. The orientation of the one or more IMU sense axes 34, 36, 38 relative to the first axis 30 is controllable by rotation of the IMU 20 about the second axis 32. For example, the orientation of the IMU sense axes 34, 36, 38 relative to the first axis of rotation 30 are shown in FIG. 2A. In FIG. 4, the orientation of the IMU sense axes 34, 36, 38 relative to the first axis of rotation 30 has changed due to rotation of the IMU 20 about the second axis of rotation 32. In this way, by changing the orientation of the one or more IMU sense axes 34, 36, 38 relative to the first axis 30 prior to or while the IMU 20 rotates about the first axis of rotation 30, the elevation hub 14 alters the forces acting along the one or more sense axes 34, 36, 38 of the IMU 20.

As will be understood by one of ordinary skill in the art, the elevation hub 14 may comprise any suitable apparatus for rotating the IMU 20 about the second axis of rotation 32. For example, the elevation hub 14 may include a support member 46 and an elevation gimbal servo 24. The support member 46 may be rotationally mounted to the rotational hub 12 by the elevation gimbal servo 24, such that the support member 46 rotates about the second axis 32 on the elevation gimbal servo 24. The elevation hub 14 may additionally include or support the IMU 20. For example, in FIGS. 2A and 2B, the IMU 20 is attached to and/or supported on a surface of the support member 46. The elevation hub 14 may rotate the IMU 20 about the second axis of rotation 32 to an elevation specified by the controller system 16 (e.g., the position of the IMU 20 relative to the second axis 32 in FIG. 2A corresponds to one elevation and the position of the IMU 20 in FIG. 4 corresponds to another elevation). In this way, the controller system 16 may control the orientation of the one or more IMU sense axes 34, 36, 38 relative to the first axis of rotation 30. As shown in FIG. 3, the elevation hub 14 may provide feedback to the controller system 16 regarding a current elevation of the IMU 20.

The controller system 16 is configured, in combination with the rotation hub 12 and elevation hub 14, to rotate the IMU 20 about the first axis of rotation 30 at a known rate of rotation with the IMU 20 positioned at a specified elevation relative to the second axis of rotation. In order to calibrate the IMU output(s) 100a, 102a, 104a, the IMU 20 is rotated about the first axis of rotation 30 at a first elevation (e.g., FIG. 2A) and at a second different elevation (e.g., FIG. 4). Based on the IMU output(s) 100a, 102a, 104a during rotation about the first axis 30 (1) at the first elevation and (2) at the second different elevation, the controller system 16 determines IMU correction factor(s) for calibrating the IMU output(s) 100a, 102a, 104a. The controller system 16 may be configured to determine the IMU correction factor(s) by comparing the IMU output(s) 100a, 102a, 104a at the first elevation and the second elevation with an expected output(s) of the IMU at the first elevation and the second elevation. The expected output(s) may be based on the known rate of rotation of the IMU 20 about the first axis of rotation 30 and the known elevation of the IMU 20.

As described previously, the controller system 16 may determine the expected output(s) of the IMU based on the centripetal equation for force and differentiation of the outputs of the IMU corresponding to angular measurements. In an alternative embodiment, the controller system 16 may look up the expected output(s) of the IMU using a table 54 stored in a non-transitory computer readable memory 52. The memory 52 may additionally store computer readable instructions that are performed by the controller system 16. In another embodiment, e.g., an embodiment in which the controller system 16 has a small control loop error, the commands supplied to the rotational hub 12 may be used along with the centripetal equation for force to determine the expected output(s) of the IMU.

As will be understood by one of ordinary skill in the art, the controller system 16 may have various implementations. For example, the controller system 16 may include any suitable device or combination of devices, such as a programmable circuit, integrated circuit, memory and I/O circuits, an application specific integrated circuit, microcontroller, complex programmable logic device, other programmable circuits, or the like. The controller system 16 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the controller system 16. Based on this disclosure, one of ordinary skill in the art would understand how to program the controller system 16 to perform the steps described herein.

While the controller system 16 is depicted as part of the rotational hub 12 in FIGS. 2A and 2B, the controller system may be a separate component from the rotational hub and/or may be a part of any other component of the calibration apparatus (e.g., the elevation hub).

As described previously, the IMU 20 has one or more sense axes 34, 36, 38 and produces an output representative of an orientation of the one or more sense axes. For example, the IMU 20 may comprise one or more accelerometers and gyroscopes and may produce an output representative of forces acting along the sense axis of each accelerometer and gyroscope. As an example, if the IMU 20 includes three accelerometers and three gyroscopes, the IMU would output six total outputs, one for each accelerometer and one for each gyroscope. As will be understood by one of ordinary skill in the art, the IMU 20 is not limited to accelerometers and gyroscopes, but may include other sensors (e.g., other sensors capable of sensing forces acting on the IMU 20 or the position of the IMU 20). The IMU 20 is similarly not limited to a single component, but may, e.g., comprise separate sensors spread across various locations. As shown in FIGS. 2A and 2B, the IMU 20 may be mounted to and/or supported by the elevation hub 14. Alternatively, the IMU 20 may be part of the elevation hub 14.

As shown in FIGS. 2A and 2B, the calibration apparatus 10 may additionally include a chamber 52. The rotational hub 12, elevation hub 14, and IMU 20 may be located within the chamber 52. The chamber 52 may comprise an insulated structure including a heating and/or cooling element. As will be understood by one of ordinary skill in the art, the chamber 52 may comprise any device capable of modulating the temperature of the IMU 20. The chamber 52 may also include a controller configured to control the temperature in the chamber 52. Alternatively, the controller system 16 may control the temperature in the chamber 52. For example, the controller system 16 may control the temperature in the chamber 52 using a temperature sensor 53 located on a component of the calibration apparatus (e.g., the thermal chamber 52, the IMU 20, etc.). By controlling the temperature of the IMU 20 during calibration, the calibration apparatus 10 may determine the relationship between temperature and the IMU correction factor(s) and/or IMU output(s) 100a, 102a, 104a. For example, the controller system 16 may be configured to set the chamber temperature prior to determining the IMU correction factor(s). By repeating this process, the controller system may determine and store the IMU correction factor(s) for multiple different temperatures. After determining the IMU correction factor(s) for multiple different temperatures, the controller system 16 may determine the relationship between temperature and the output(s) of the IMU 100a, 102a, 104a.

In the embodiment including a gimbaled antenna, if the gimbaled antenna is constructed to fit in the thermal chamber, a full system level calibration can be performed. An accurate IMU calibration at the system level allows for integrating more cost effective sensors. For example, in one embodiment, the gimbaled antenna may include the IMU 20, the rotational hub 12, the elevation hub 14, and the controller system 16. For example, the IMU 20 may be mounted on a surface (e.g., the back) of a flat-plate antenna forming part of the elevation hub 14 and free to rotate about the second axis of rotation 32.

Figure 5:
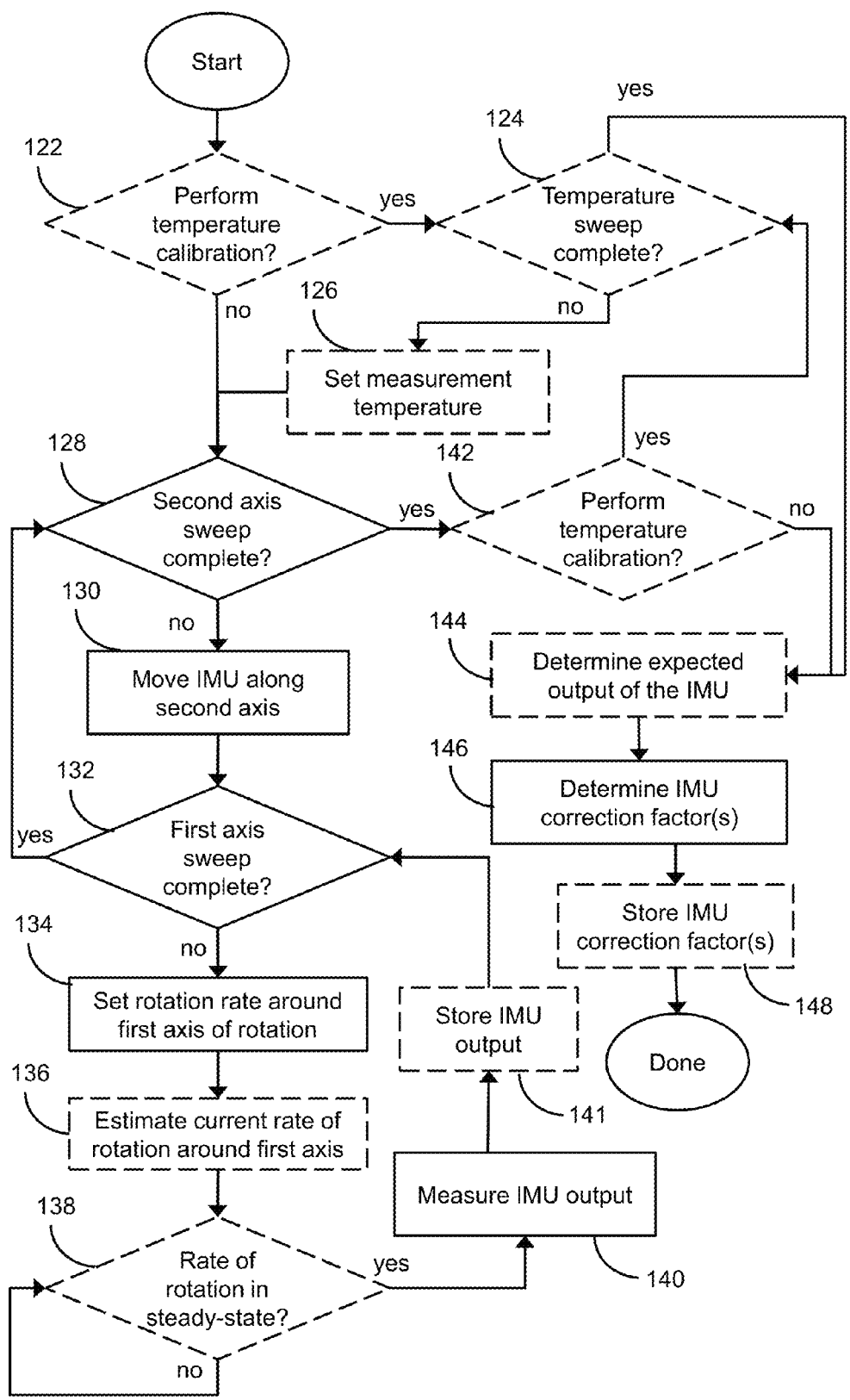
FIG. 5 is a block diagram of a method for calibrating an IMU using the calibration apparatus.

With reference to FIG. 5, a block diagram depicting a method of calibrating an IMU using rotational rate as a reference is shown. The method steps described may be performed and/or directed solely or in part by the controller system 16.

In optional decision block 122, a check is performed to determine if temperature calibration is to be performed. If temperature calibration is to be performed, another check is performed in optional decision block 124 to determine if the temperature sweep has been completed. If the temperature sweep is complete, then the method is complete. If the temperature sweep is not complete in optional decision block 124, then the temperature is set to a measurement temperature in optional process block 126. The measurement temperature may be one of a series of measurement temperatures for which correction factor(s) are to be determined. That is, the method may change the current temperature between a series of measurement temperatures and, for each measurement temperature, determine the IMU correction factor(s) for calibrating the output(s) of the IMU at the measurement temperature.

After setting the measurement temperature in optional process block 126 or in optional process block 122 if the temperature calibration is not to be performed, a check is performed to determine if the second axis sweep is complete in decision block 128. For example, in one embodiment, the IMU 20 is rotated along the second axis of rotation 32 to a first elevation (e.g., the IMU position in FIG. 2A relative to the second axis 32) and later to a second elevation (e.g., the IMU position in FIG. 4 relative to the second axis 32) before the second axis sweep is complete. In this example, if the IMU 20 has not yet been rotated along the second axis of rotation to both the first elevation and the second elevation, then the second axis sweep is not complete. In this example, assuming the method is just starting, the IMU would be rotated along the second axis of rotation 32 to the first elevation (FIG. 2A).

In decision block 132, a check is performed to determine if the first axis sweep is complete. For example, in one embodiment of the method, after the IMU has been rotated along the second axis of rotation 32 to the first elevation (FIG. 2A), the IMU is rotated about the first axis of rotation 30 at a known rate of rotation with the IMU 20 positioned at the first elevation relative to the second axis of rotation. In this example, if the IMU 20 has already been rotated about the first axis rotation 30 at a known rate of rotation with the IMU positioned at the first elevation, the method would move back to decision block 128. If the IMU has not already been rotated about the first axis rotation at a known rate of rotation with the IMU positioned at the first elevation, then the method moves to process block 134.

In process block 134, the rotation rate of the IMU 20 around the first axis of rotation 30 is set. In optional process block 136, the method estimates the current rate of rotation around the first axis 30 and, as shown in optional decision block 138, the method waits until the rate of rotation about the first axis has reached a steady-state before moving to process block 140.

Following process block 134 or optional process block 138, the IMU output(s) 100a, 102a, 104a are measured. Following measurement of the IMU output(s) 100a, 102a, 104a, the IMU output(s) 100a, 102a, 104a are optionally stored in process block 141 and the method returns to decision block 132. The IMU output(s) 100a, 102a, 104a may be stored in a non-transitory computer readable memory 52 separate from or a part of the controller system 16.

If the first axis sweep has been completed for the given elevation, processing returns to decision block 128. In this example, if the IMU output(s) at the first elevation have been received, but the output(s) of the IMU at the second elevation has not yet been received, processing moves to process block 130. In this example, the IMU 20 is rotated along the second axis of rotation 32 to the second elevation (FIG. 4) in process block 130. Next, the method steps are repeated with the IMU 20 located at the second elevation relative to the second axis of rotation. That is, the IMU 20 is rotated about the first axis of rotation 30 at a known rate of rotation with the IMU positioned at the second elevation relative to the second axis of rotation 32.

Following completion of the second axis sweep in decision block 128, processing moves to optional process block 142. In optional process block 142, a check is performed to determine if temperature calibration is being performed. If temperature calibration is being performed, processing moves to optional decision block 124. In optional decision block 124, a check is performed to determine if the temperature sweep is complete. If the temperature sweep is not yet complete, then processing moves to process block 126, in which a new temperature is set. Following completion of optional process block 126, the second axis sweep and first axis sweep are again completed in decision blocks 128 and 132 respectively.

Following completion of the second axis sweep in decision block 128 or completion of the optional temperature sweep in optional decision block 124, processing moves to optional process block 144. In optional process block 144, the expected output(s) of the IMU 100b, 102b, 104b are determined. As would be understood by one of ordinary skill in the art, determining the expected output(s) of the IMU may be determined using any suitable method. For example, determining the expected output(s) of the IMU may include looking up the expected output(s) in a table 54 based on an average rate of rotation and the orientation of the sense axis relative to the axis of rotation. Alternatively, determining the expected output(s) of the IMU may include calculating the expected output(s) based on the centripetal force acting on the IMU, the orientation of the one or more sense axes of the IMU relative to the first axis of rotation 30, and the known rate of rotation of the IMU about the first axis of rotation 30.

Determining the expected output(s) of the IMU in optional process block 144 may be dependent on the type of sensors in the IMU. For example, if the IMU includes one or more accelerometers and one or more gyroscopes, determining the expected output(s) may include determining separately the output of each accelerometer and each gyroscope. Determining the expected output(s) of the gyroscopes may be based on the rate of rotation about the first axis of rotation 30 and the orientation of the sense axis for each gyroscope output relative to the first axis of rotation 30. Determining expected output(s) of the accelerometers may be based on an estimated centripetal force experienced by the IMU. The centripetal force experienced by the IMU may be dependent on a location of the IMU relative to the first axis. For example, as shown in FIGS. 2A and 2B, the location of the IMU relative to the first axis may be equal to the length of the support arms 44. The location of the IMU relative to the first axis may be additionally dependent upon a position of the IMU about the second axis of rotation. That is, if the IMU is mounted at a distance offset from the second axis of rotation 32, the location of the IMU relative to the first axis may not be equal to the length of the support arms 44. For example, as shown in FIGS. 2A and 2B, the length of a centripetal force vector 50 is not equal to the length of the support arms 44, but is also dependent upon the positioning of the IMU along the second axis of rotation and the position of the IMU relative to the second axis of rotation (due to rotation of the IMU about the second axis of rotation). In this example, the centripetal force acting on the IMU 20 may be proportional to the rate of rotation multiplied by the distance of the IMU to the first axis of rotation 30.

In process block 146, the method determines—based on the output(s) of the IMU during rotation of the IMU at the first elevation and the output(s) of the IMU during rotation at the second elevation—an IMU correction factor(s) for calibrating the output(s) of the IMU. The IMU correction factor(s) may include one or more biases for correcting additive errors (i.e., bias errors) in the IMU output(s) 100a, 102a, 104a and one or more scale factors for correcting multiplicative errors (i.e., scale factor errors) in the IMU output(s) 100a, 102a, 104a. For example, the correction factor(s) may include one bias and one scale factor for each accelerometer and gyroscope in the IMU 20. As will be understood by one of ordinary skill in the art, the correction factor(s) are not limited to two factors for each sensor in the IMU 20, but may include any number of terms.

Determining the IMU correction factor(s) may include comparing the output(s) of the IMU at the first elevation and the IMU output(s) at the second elevation with the expected output(s) of the IMU at the first elevation and the expected IMU output(s) at the second elevation. For example, each of the IMU output(s) may comprise one data point equal to an average of the IMU output over a period of time during which the IMU was rotating about the first axis of rotation at a known rate of rotation and at a constant elevation. In this example, the method could compare each average IMU output with an expected output to determine a correction factor including a bias and a scale factor. As described above, the expected output(s) may be based on the known rate of rotation of the IMU about the first axis and the known elevation of the IMU.

As shown in FIG. 5, the IMU correction factor(s) may be determined off-line. That is, the IMU correction factor(s) may be determined after completion of the second axis sweep. When determined off-line, the IMU correction factor(s) may be determined using batch lease squares or similar methods. Alternatively, the IMU correction factor(s) may be continuously estimated and refined using various parameter estimation methods (e.g., recursive least squares, other non-linear estimation methods that employ min max solutions, etc.). Upon completion of determining the IMU correction factor(s), the IMU correction factor(s) may be stored in EPROM or flash memory.

In an alternative embodiment depicted in FIGS. 1A-1C, as opposed to using a single data point, the method utilizes a series of data points for each IMU output representing the IMU output at a series of time points. In this embodiment, as shown in FIG. 1A, each IMU output represents a series of points over a duration of time. In this example, if the rate of rotation and orientation of the IMU relative to the first axis was constant, then the expected output(s) should also be constant. In the example depicted in FIGS. 1A-1C, however, the rate of rotation varied slightly with time and, therefore, the expected output also varies slightly with time. In this embodiment, the correction factor for each IMU output may, as in the previous example, include a bias and a scale factor. The same method may be used to determine the correction factor(s) for an IMU output comprising a single data point and an IMU output comprising a series of data points.

As shown in FIGS. 1A-1C, applying the IMU correction factor(s) to the output(s) 100a, 102a, 104a of the IMU calibrates the output(s) of the IMU such that the difference between the expected output(s) 100b, 102b, 104b of the IMU and the calibrated output(s) 100c, 102c, 104c of the IMU is less than the difference between the output(s) 100a, 102a, 104a of the IMU and the calibrated output(s) 100c, 102c, 104c of the IMU. As will be understood by one of ordinary skill in the art, the correction factor may be determined such that: (1) the calibrated output(s) 100c, 102c, 104c of the IMU is approximately equal to the expected output(s) 100b, 102b, 104b of the IMU or (2) the variance, standard deviation, and/or error between the calibrated output(s) 100c, 102c, 104c of the IMU and the expected output(s) 100b, 102b, 104b of the IMU is less than the variance, standard deviation, and/or error between the IMU output(s) 100a, 102a, 104a and the expected output(s) 100b, 102b, 104b of the IMU. As will be understood by one of ordinary skill in the art, the IMU correction factor(s) may be determined by fitting a rational polynomial to the output of the IMU. Alternatively, correction factor(s) may be determined for each IMU output using algebraic expressions. For example, the following expression may be used to solve for a correction factor:

$$\min_{a_N, a_{N-1}, \ldots, a_0} \| y - (a_N \omega^N + a_{N-1} \omega^{N-1} + \ldots + a_1 \omega + a_0) \|_2$$

where, $a_N$, $a_{N-1}$, $a_0$ are the coefficients of an N-th order calibration polynomial (the IMU correction factor(s)), y is the calibration reference signal (the IMU expected output), $\omega$ is the IMU output signal (uncalibrated), and $\|\cdot\|_2$ denotes the 2-norm used for finding optimal polynomial coefficients $a_k$, where k=0, 1, . . . , N.

For example, in order to calibrate an IMU output corresponding to accelerometer measurements, the expected output for the IMU may be derived from centripetal forces experienced by the IMU. Additionally, in order to calibrate an IMU output corresponding to gyroscopic measurements, the expected output for the IMU may be based on angular rates measured by the calibration apparatus 10. For example, the angular rates may be derived by differentiation of the IMU outputs or direct feedback from a tachometer. If the calibration is performed with respect to temperature, then each IMU correction factor ($a_k$ in the above equation) will depend on temperature and the optimization equation is written in terms of a two-dimensional matrix polynomial with size N by M, where the M is the dimension of a polynomial used to compensate for temperature variation.

In optional process block 148, the IMU correction factor(s) are stored. For example, the correction factor(s) may be stored in a non-transitory computer readable medium separate from or a part of the controller system 16.

The method steps are shown as sequential operations, but the steps need not be performed in the described order. For example, when performing temperature calibration, the IMU correction factor(s) may be determined for one measurement temperature before another second axis sweep is begun for another measurement temperature.

As described above in reference to optional process block 144, the expected output(s) 100b, 102b, 104b of the IMU is determined without reference to gravity. As will be understood by one of ordinary skill in the art, however, gravity may be used as an optional input to the calibration method when determining the expected IMU output(s) 100b, 102b, 104b. That is, the expected output(s) 100b, 102b, 104b of the IMU may be determined using gravity in addition to the known rate of rotation and the known orientation of the IMU sense axis relative to the first axis of rotation 30. For example, the gravity may be used to validate the results of calibration. That is, as shown in FIG. 1C, if an accelerometer is aligned with the vector of gravitational force and correctly calibrated, the output (output 100c for the first 75 seconds and output 102c after the first 75 seconds) of the accelerometer should be approximately 9.8 m/s$^2$.

As described above with reference to optional blocks 122, 124, and 126, the correction factor(s) may be determined for multiple different temperatures. In this way, the relationship between temperature and the IMU output(s) (e.g., the outputs of the gyroscopes and the accelerometers) may be determined. For example, the relationship may be determined by estimating coefficients of an N-th degree rational polynomial using temperature and at least one of IMU output(s), expected IMU output(s), and correction factor(s). The estimated polynomial may be used to simultaneously correct for temperature variation and higher order error terms (i.e., not limited to first-order polynomial corrections for scale factor and bias errors). The polynomial coefficients may be estimated recursively or using any other suitable method (batch least-squares) as would be understood by one of ordinary skill in the art. The method is not limited to estimating coefficients of polynomial. Rather, as would be understood by one of ordinary skill in the art, any suitable algebraic expression may be used without a loss of generality.

In one embodiment, rather than put the calibration apparatus or gimbaled satellite in a thermal chamber 52, the calibration apparatus and/or gimbaled satellite may include a temperature sensor 53. The temperature sensor 53 may be a component of and attached to the calibration apparatus or gimbaled satellite. Alternatively, the temperature sensor may be physically separate from the calibration apparatus or gimbaled satellite but communicatively coupled (e.g., wired or wirelessly) to the calibration apparatus or gimbaled satellite. The controller system may be configured to associate the stored IMU correction factor(s) with a current temperature measured using the temperature sensor. By calibrating the gimbaled antenna when new temperatures are experienced by the IMU 20, the correction factor(s) and/or IMU output(s) of the gimbaled antenna may be recorded, allowing for a system level calibration of the gimbaled antenna without requiring a thermal chamber 52.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

The invention claimed is:

1. A calibration system for calibrating an inertial measurement unit (IMU) having a sense axis and producing an output representative of an orientation of the sense axis, the calibration system comprising:
 a rotational hub configured to rotate the IMU about the first axis of rotation;
 an elevation hub configured to rotate the IMU about a second axis of rotation perpendicular to the first axis of rotation, the orientation of the sense axis relative to the first axis being controllable by rotation of the IMU about the second axis; and
 a controller system configured in combination with the rotation hub and elevation hub to:
 rotate the IMU about the first axis of rotation at a known rate of rotation with the IMU positioned at a first elevation relative to the second axis of rotation;
 rotate the IMU about the first axis of rotation at a known rate of rotation with the IMU positioned at a second elevation relative to the second axis of rotation, the second elevation being different from the first elevation; and
 based on the output of the IMU during the rotation of the IMU at the first elevation and the output of the IMU during the rotation of the IMU at the second elevation, determining an IMU correction factor for calibrating the output of the IMU.

2. The calibration system of claim 1, wherein the controller system is configured to determine the IMU correction factor by comparing the output of the IMU at the first elevation and the output of the IMU at the second elevation with a first expected output of the IMU at the first elevation and a second expected output of the IMU at the second elevation, respectively, the first expected output being based on the known rate of rotation of the IMU about the first axis and the second expected output being based on the known elevation of the IMU relative to the second axis.

3. The calibration system of claim 2, wherein applying the IMU correction factor to the output of the IMU at the first elevation and the output of the IMU at the second elevation calibrates the output of the IMU such that: the difference between the expected output of the IMU at the first elevation and the calibrated output of the IMU at the first elevation is less than the difference between the expected output of the IMU at the first elevation and the output of the IMU at the first elevation; and the difference between the expected output of the IMU at the second elevation and the calibrated output of the IMU at the second elevation is less than the difference between the output of the IMU at the second elevation and the calibrated output of the IMU at the second elevation.

4. The calibration system of claim 2, wherein the IMU includes one or more gyroscopes and one or more accelerometers and determining the expected output of the IMU further includes: determining an expected output of the one or more accelerometers based on an estimated centripetal force experienced by the IMU; and determining an expected output of the one or more gyroscopes based on the known rate of rotation.

5. The calibration system of claim 4, wherein the centripetal force experienced by the IMU is dependent on a location of the IMU relative to the first axis and the location of the IMU relative to the first axis is additionally dependent upon a position of the IMU about the second axis of rotation.

6. The calibration system of claim 5, wherein the IMU is mounted at a distance offset from the second axis of rotation.

7. The calibration system of claim 1, further comprising a chamber, wherein the controller system is configured to control the temperature in the chamber and the rotational hub, elevation hub, and IMU are located within the chamber.

8. The calibration system of claim 7, wherein the controller system is configured to set the chamber temperature prior to determining the IMU correction factor.

9. The calibration system of claim 8, wherein the controller system is configured to set the chamber temperature to multiple different temperatures and determine the IMU correction factor for each temperature of the multiple different temperatures.

10. The calibration system of claim 9, wherein the controller system is further configured to determine the relationship between temperature and the output of the IMU and/or the IMU correction factor.

11. The calibration system of claim 10, wherein the relationship between temperature and the actual output of the IMU and/or the IMU correction factor is determined by estimating coefficients of an N-th degree polynomial.

12. The calibration system of claim 11, wherein the coefficients are estimated recursively.

13. The calibration system of claim 1, wherein the IMU correction factor is determined by fitting a rational polynomial to the actual output of the IMU.

14. A self-calibrating gimbaled antenna system configured to calibrate an inertial measurement unit (IMU), the IMU having a sense axis and producing an output representative of an orientation of the sense axis, the gimbaled antenna system comprising:
   a rotational hub configured to rotate the IMU about the first axis of rotation;
   an elevation hub configured to rotate the IMU about a second axis of rotation perpendicular to the first axis of rotation, the orientation of the sense axis relative to the first axis being controllable by rotation of the IMU about the second axis; and
   a controller system configured in combination with the rotation hub and elevation hub to:
   rotate the IMU about the first axis of rotation at a known rate of rotation with the IMU positioned at a first elevation relative to the second axis of rotation;
   rotate the IMU about the first axis of rotation at a known rate of rotation with the IMU positioned at a second elevation relative to the second axis of rotation, the second elevation being different from the first elevation; and
   based on the output of the IMU during the rotation of the IMU at the first elevation and the output of the IMU during the rotation of the IMU at the second elevation, determining an IMU correction factor for calibrating the output of the IMU.

15. The self-calibrating gimbaled antenna system of claim 14, wherein the controller system is configured to determine the IMU correction factor by comparing the output of the IMU at the first elevation and the output of the IMU at the second elevation with a first expected output of the IMU at the first elevation and a second expected output of the IMU at the second elevation, respectively, the first expected output being based on the known rate of rotation of the IMU about the first axis and the second expected output being based on the known elevation of the IMU relative to the second axis.

16. The self-calibrating gimbaled antenna system of claim 15, wherein applying the IMU correction factor to the output of the IMU at the first elevation and the output of the IMU at the second elevation calibrates the output of the IMU such that: the difference between the expected output of the IMU at the first elevation and the calibrated output of the IMU at the first elevation is less than the difference between the expected output of the IMU at the first elevation and the output of the IMU at the first elevation; and the difference between the expected output of the IMU at the second elevation and the calibrated output of the IMU at the second elevation is less than the difference between the output of the IMU at the second elevation and the calibrated output of the IMU at the second elevation.

17. The self-calibrating gimbaled antenna system of claim 15, wherein the IMU includes one or more gyroscopes and one or more accelerometers and determining the expected output of the IMU further includes: determining an expected output of the one or more accelerometers based on an estimated centripetal force experienced by the IMU; and determining an expected output of the one or more gyroscopes based on the known rate of rotation.

18. The self-calibrating gimbaled antenna system of claim 17, wherein the centripetal force experienced by the IMU is dependent on a location of the IMU relative to the first axis and the location of the IMU relative to the first axis is additionally dependent upon a position of the IMU about the second axis of rotation.

19. The self-calibrating gimbaled antenna system of claim 18, wherein the IMU is mounted at a distance offset from the second axis of rotation.

20. The self-calibrating gimbaled antenna system of claim 14, further comprising a flat plate antenna, wherein the IMU is mounted to a surface of the flat plate antenna.

21. The self-calibrating gimbaled antenna system of claim 14, further comprising a temperature sensor, wherein the controller system is further configured to associate the determined IMU correction factor with a current temperature measured using the temperature sensor.

22. A method of calibrating an inertial measurement unit (IMU) having a sense axis and producing an output representative of an orientation of the sense axis, the method comprising:
   rotating the IMU along a second axis of rotation to a first elevation, the orientation of the sense axis relative to a first axis of rotation being controllable by rotation of the IMU about the second axis, wherein the first axis of rotation is perpendicular to the second axis rotation;
   rotating the IMU about the first axis of rotation at a known rate of rotation with the IMU positioned at the first elevation relative to the second axis of rotation;
   rotating the IMU along the second axis of rotation to a second elevation;
   rotating the IMU about the first axis of rotation at a known rate of rotation with the IMU positioned at the second elevation relative to the second axis of rotation; and
   determining, based on the output of the IMU during the rotation of the IMU at the first elevation and the output of the IMU during the rotation at the second elevation, an IMU correction factor for calibrating the output of the IMU.

23. The method of claim 22, further comprising determining the IMU correction factor by comparing the output of the IMU at the first elevation and the output of the IMU at the second elevation with a first expected output of the IMU at the first elevation and a second expected output of the IMU at the second elevation, respectively, the first expected output being based on the known rate of rotation of the IMU about the first axis and the second expected output being based on the known elevation of the IMU relative to the second axis.

24. The method of claim 22, wherein applying the IMU correction factor to the output of the IMU at the first elevation and the output of the IMU at the second elevation calibrates the output of the IMU such that: the difference between the expected output of the IMU at the first elevation and the calibrated output of the IMU at the first elevation is less than the difference between the expected output of the IMU at the first elevation and the output of the IMU at the first elevation; and the difference between the expected output of the IMU at the second elevation and the calibrated output of the IMU at the second elevation is less than the difference between the output of the IMU at the second elevation and the calibrated output of the IMU at the second elevation.

25. The method of claim 23, wherein the IMU includes one or more gyroscopes and one or more accelerometers and determining the expected output of the IMU further includes: determining an expected output of the one or more accelerometers based on an estimated centripetal force experienced by the IMU; and
    determining an expected output of the one or more gyroscopes based on the known rate of rotation.

26. The method of 25, wherein the centripetal force experienced by the IMU is dependent on a location of the IMU relative to the first axis and the location of the IMU relative to the first axis is additionally dependent upon a position of the IMU about the second axis of rotation.

27. The method of claim 22, further comprising, prior to rotating the IMU along the second axis of rotation to the first elevation, setting a current temperature to a measurement temperature.

28. The method of claim 27, further comprising: changing the current temperature between a series of measurement temperatures; and for each measurement temperature, determining the IMU correction factor for calibrating the output of the IMU at the measurement temperature.

\* \* \* \* \*